United States Patent [19]

Frank et al.

[11] Patent Number: 4,711,653

[45] Date of Patent: Dec. 8, 1987

[54] INNOVATIVE PRESS BENDING OF THERMOPLASTIC SHEETS

[75] Inventors: Robert G. Frank, Franklin Township, Butler County; George R. Claassen, New Kensington; Thomas L. Waterloo, Allison Park; Stephen J. Schultz, Indiana Township, West Moreland County; Michael T. Fecik, Pittsburgh, all of Pa.

[73] Assignee: PPG Industries, Inc., Pittsburgh, Pa.

[21] Appl. No.: 947,253

[22] Filed: Dec. 29, 1986

[51] Int. Cl.[4] ............................................. C03B 23/03
[52] U.S. Cl. ...................................... 65/106; 65/104; 65/273
[58] Field of Search ................. 65/290, 291, 104, 106, 65/273

[56] References Cited

U.S. PATENT DOCUMENTS

| | | | |
|---|---|---|---|
| 3,177,060 | 4/1965 | Pedersen | 65/273 X |
| 4,221,580 | 9/1980 | Frank | 65/273 |
| 4,265,650 | 5/1981 | Reese et al. | 65/104 |
| 4,285,715 | 8/1981 | Frank | 65/106 |
| 4,290,796 | 9/1981 | Reese et al. | 65/287 |
| 4,297,118 | 10/1981 | Kellar et al. | 65/104 |
| 4,366,013 | 12/1982 | Valimont et al. | 156/102 |
| 4,367,106 | 1/1983 | Valimont | 156/102 |
| 4,367,107 | 1/1983 | Valimont et al. | 156/102 |
| 4,368,087 | 1/1983 | Valimont et al. | 156/102 |
| 4,430,110 | 2/1984 | Frank et al. | 65/104 |
| 4,433,993 | 2/1984 | Frank | 65/104 |
| 4,508,556 | 4/1985 | Bennett et al. | 65/106 X |
| 4,579,573 | 4/1986 | Fecik et al. | 65/106 |
| 4,579,577 | 4/1986 | Claassen | 65/273 |

*Primary Examiner*—Arthur Kellogg
*Attorney, Agent, or Firm*—Andrew C. Siminerio

[57] ABSTRACT

A press bending apparatus includes a shaping station having an upper mold with a shaping surface having a generally concave downward elevational configuration and a lower mold with an apertured shaping surface complementing the shaping surface of the upper mold. A vacuum shuttle transfers heat softened glass sheets from a heating furnace to the shaping station where it deposits the glass sheets on the lower vacuum mold. The glass sheet is shaped between the molds. A rotating arrangement rotates the lower mold and the shaped glass sheet held thereagainst by vacuum from a first position wherein the shaping surface of the lower mold faces upward to a second position wherein the shaping surface of the lower mold faces downward. The shaped glass sheet is then deposited on a tempering ring. A rotating arrangement maintains vacuum in the lower mold as the mold rotates.

24 Claims, 17 Drawing Figures

INNOVATIVE PRESS BENDING OF THERMOPLASTIC SHEETS

BACKGROUND OF THE INVENTION

1. Field of the Invention

This invention relates to bending of glass sheets and in particular to a horizontal press bending arrangement wherein glass sheets are shaped between an upper female mold and a rotating full-face vacuum male mold.

2a. Technical Considerations

Shaped and tempered glass sheets are widely used as side windows or rear windows in vehicles such as automobiles and the like, and, to be suitable for such applications, flat glass sheets must be shaped to precisely defined curvatures dictated by the shape and outline of the frames defining the window openings in the vehicle. It is also important that the side or rear windows meet stringent optical requirements and that the windows be free of optical defects that would tend to interfere with the clear viewing therethrough in their viewing area.

The commercial production of shaped glass sheets for such purposes commonly includes heating flat glass sheets to their heat softening temperature, shaping the heated glass to a desired curvature, and cooling the bent sheets in a controlled manner to a temperature below the strain point temperature of the glass e.g., tempering, to strengthen the glass and increase its resistance to damage resulting from impact. During such treatment, a glass sheet is conveyed along a substantially horizontal path that extends through a tunnel type furnace. The glass sheet is one of a series of sheets and is heated to its deformation temperature and transferred, for example, by a vacuum pick-up and shuttle arrangement into a shaping station adjacent to the furnace where the glass sheet is pressed between a pair of vertically aligned upper and lower shaping molds. The upper mold is generally a vacuum male mold, i.e., it has a generally convex sheet shaping surface that holds the heat softened glass sheet by suction and the lower mold is generally a female mold, i.e., it has a generally concave sheet shaping surface complementing the shaping surface of the upper mold. After shaping, a transfer and tempering ring having an outline and elevational contour conforming to that desired for the glass sheet slightly inboard of its perimeter moves downstream into a position below the upper vacuum mold. Release of the vacuum deposits the glass sheet onto the tempering ring which supports the peripheral portion of the glass while it conveys the glass sheet into a cooling station for rapid cooling.

As stylists continue to strive toward more aerodynamic automotive and aircraft designs, the bent shape of the glass sheets are becoming more complex. These designs include small radius bends, reverse curvatures in both the longitudinal and transverse direction, and tight dimensional and contour tolerances. These types of shapes are becoming increasingly more difficult to form using conventional pressing techniques. The shaped glass sheets are generally formed by pressing the end portions of the heat softened sheets upward relative to the central portions of the sheet. As a result, in order to conform with the shaping surfaces of the molds, portions of the glass sheets are forced in a direction opposite to its natural tendency to sag downwardly due to gravity. In some instances, the glass sheets must be heated to temperatures well above the normal heat softening temperature of 1050° F. to 1150° F. (566° C. to 621° C.), so that the glass is pliable enough to attempt to form these complex shapes.

It would be advantageous to have a press bending arrangement that could form these complex shapes in the glass sheets while maintaining the quality optics required for use in automobile and aircraft vehicles.

2b. Patents of Interest

U.S. Pat. No. 4,290,796 to Reese et al. teaches a glass sheet shaping apparatus for press bending glass doublets. Bending irons support the glass sheets as the irons are conveyed through a heating lehr, to preform the glass sheets by gravity sagging. The bending irons stop at a shaping station in approximate alignment between a pair of upper and lower vertically aligned pressing molds. The upper mold includes a full-face male pressing surface and the lower mold includes a full-face female pressing surface. The glass sheets are lifted off of the bending iron by the lower shaping mold and pressed between the complementing shaping surfaces. The shaped glass is then redeposited onto the bending iron which transfers the shaped glass out of the shaping station for subsequent cooling.

U.S. Pat. Nos. 4,221,580; 4,285,715; and 4,433,993 to Frank and No. 4,330,110 to Frank et al. teach a horizontal press bending operation wherein heated glass sheets enter a shaping station and are lifted off run-in conveyor rolls by a slotted mold. The glass sheet is pressed between the slotted lower mold and a shaped upper vacuum mold having a full-face male pressing surface. After pressing, the lower mold is retracted to a position beneath the run-in rolls. A shuttling tempering ring is positioned below the vacuum mold and the vacuum is released so that the shaped glass is deposited onto the tempering ring. The ring subsequently transfers the shaped glass to a quenching station to temper the bent glass sheet.

U.S. Pat. No. 4,297,118 to Kellar et al. teaches a shuttling, deformable vacuum mold that engages a heated glass sheet within a heating furnace. The deformable mold may change its surface engaging configuration from a flat surface to a convex shaping surface while engaging the glass sheet. The deformable vacuum mold deposits the shaped glass sheet onto a shuttling tempering ring that is positioned beneath the mold. After depositing the glass, the vacuum mold shuttles to a position outside of the furnace to cool prior to reentering the furnace to engage the next glass sheet.

U.S. Pat. No. 4,508,556 to Bennett et al. teaches a method of press bending a glass sheet to an S-shaped cross-sectional configuration. The glass sheet is conveyed on a gas hearth support where it is heated to its heat softening temperature and transferred into a shaping station which includes an auxiliary gas hearth to support the glass sheet. The downstream end of the auxiliary gas hearth is curved downward to impart an initial curved configuration to the heated glass sheet. A ring-type shaping mold which surrounds the gas hearth lifts the glass sheet and presses it against an upper full-face male vacuum mold to impart the final shaped configuration. After shaping, the ring mold is retracted and a tempering ring is moved beneath the upper vacuum male mold to receive the shaped glass sheet and remove it for tempering.

U.S. Pat. Nos. 4,366,013, 4,367,107 and 4,368,087 to Valimont et al. and 4,367,106 to Valimont each teach a method and apparatus for assembling a laminated structure. The assembly include a vacuum holder for inserting a sheet of interlayer material between a pair of shaped glass sheets. The interlayer material is positioned on and held against the upwardly facing apertured wall of the holder by vacuum. The holder is then rotated, inserted between the spaced glass sheets and moved into engagement with the lower glass sheet to deposit the interlayer material thereon. The vacuum is discontinued, the vacuum holder is lifted off the assembly leaving the interlayer material on the lower glass sheet. The holder is removed from between the sheets and rotated back to its original position for the next assembly.

SUMMARY OF THE INVENTION

An object of this invention is to provide a press bending apparatus for shaping heat softened glass sheets to complex shapes while maintaining quality optics. The press bending apparatus includes a shaping station having an upper mold with a downwardly facing shaping surface and a lower mold with an apertured upwardly facing shaping surface. A vacuum shuttle transfers heat softened glass sheets from a heating furnace to the shaping station where it deposits the glass sheets on the lower vacuum mold. The glass sheet is shaped between the molds. A rotating arrangement rotates the lower mold and the shaped glass sheet held thereagainst by vacuum from a first position wherein the shaping surface of the lower mold faces upward and is in facing relation to the shaping surface of the upper mold to a second position wherein the shaping surface of the lower mold faces downward. The shaping surface of the upper mold has a generally concave downward elevational configuration which complements the shaping surface of the lower mold. A rotating arrangement maintains vacuum in the lower mold as the mold rotates.

Another object of the invention is to provide a method for shaping heat softened glass sheets. The glass sheets are heated to their heat softening temperature and deposited at a shaping station where the glass sheets are shaped between a pair of vertically aligned upper and lower shaping molds. After shaping, the glass sheet is held against the lower mold which is thereafter rotated from a first position wherein the glass sheet is above the lower mold to a second position wherein the glass sheet is below the mold. Thereafter, the shaped glass sheet is removed from the lower mold and the shaping station. The lower mold may be a vacuum mold such that the glass sheet is held against the lower mold while it is rotated by the vacuum. After shaping, the glass sheet is removed from the inverted lower mold by terminating its vacuum and depositing the shaped glass sheet on a tempering ring.

The press bending arrangement in the present invention deposits the heat softened glass sheet on a lower full surface male press face and allows the glass to initially conform to the shape of the press under the force of gravity. As the upper mold presses the glass sheet between the upper and lower molds, it further moves the glass sheet in the direction in which it will normally sag. In conventional sag bending, the perimeter of the glass sheet is supported and its center sags downward under the force of gravity. In the present invention, the lower mold provides a male pressing surface i.e., a pressing surface that is generally convex upward, so that the glass sheet sags into conformance with the full surface of the press and its peripheral areas rather than its center sags downward to provide the complex and deep wrap configurations required. During pressing, the upper mold presses the peripheral regions of the glass sheet downward even further into contact with the lower mold so as to obtain the desired configuration.

DETAILED DESCRIPTION OF THE INVENTION

The present invention is presented with respect to shaping glass sheets, but it should be appreciated that the invention may be used to shape any heat softenable sheet material.

Figure 1:
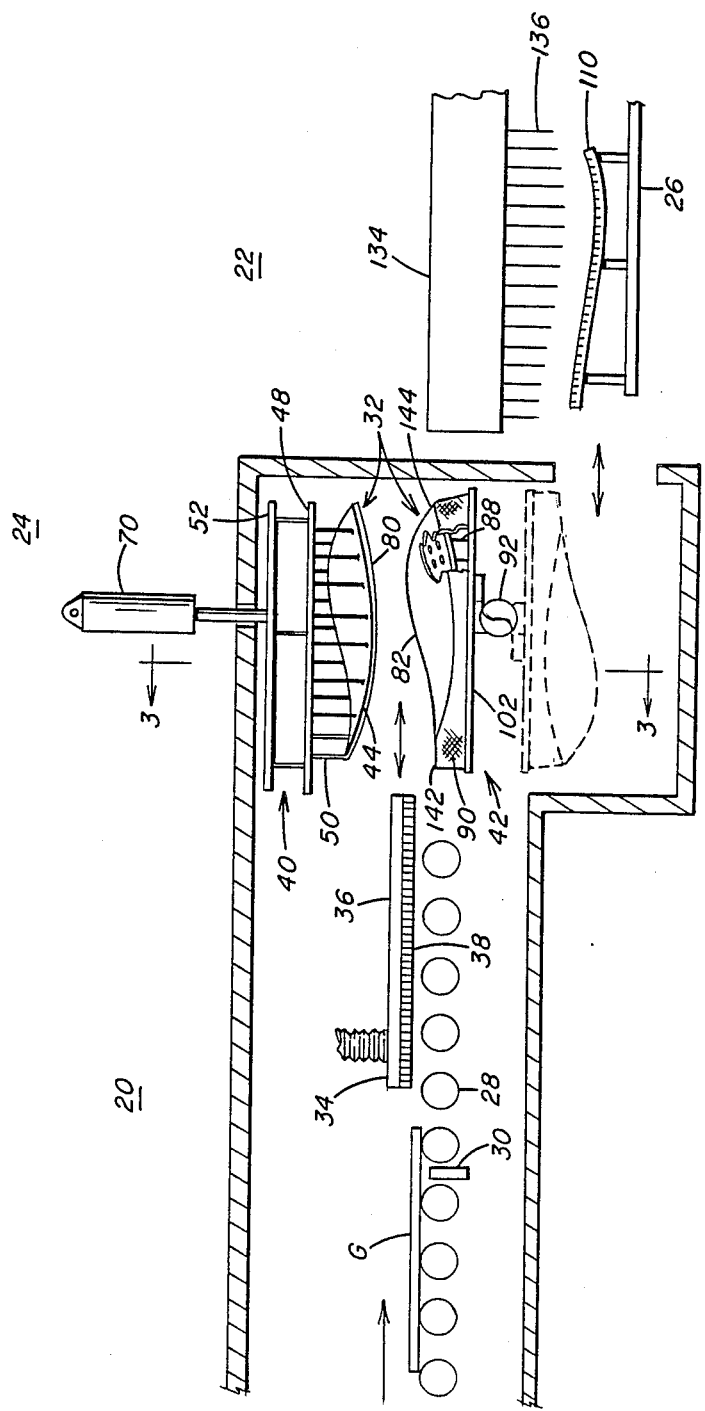
FIG. 1 is an elevational view of a glass sheet shaping and cooling arrangement incorporating the present invention.
Figure 2:
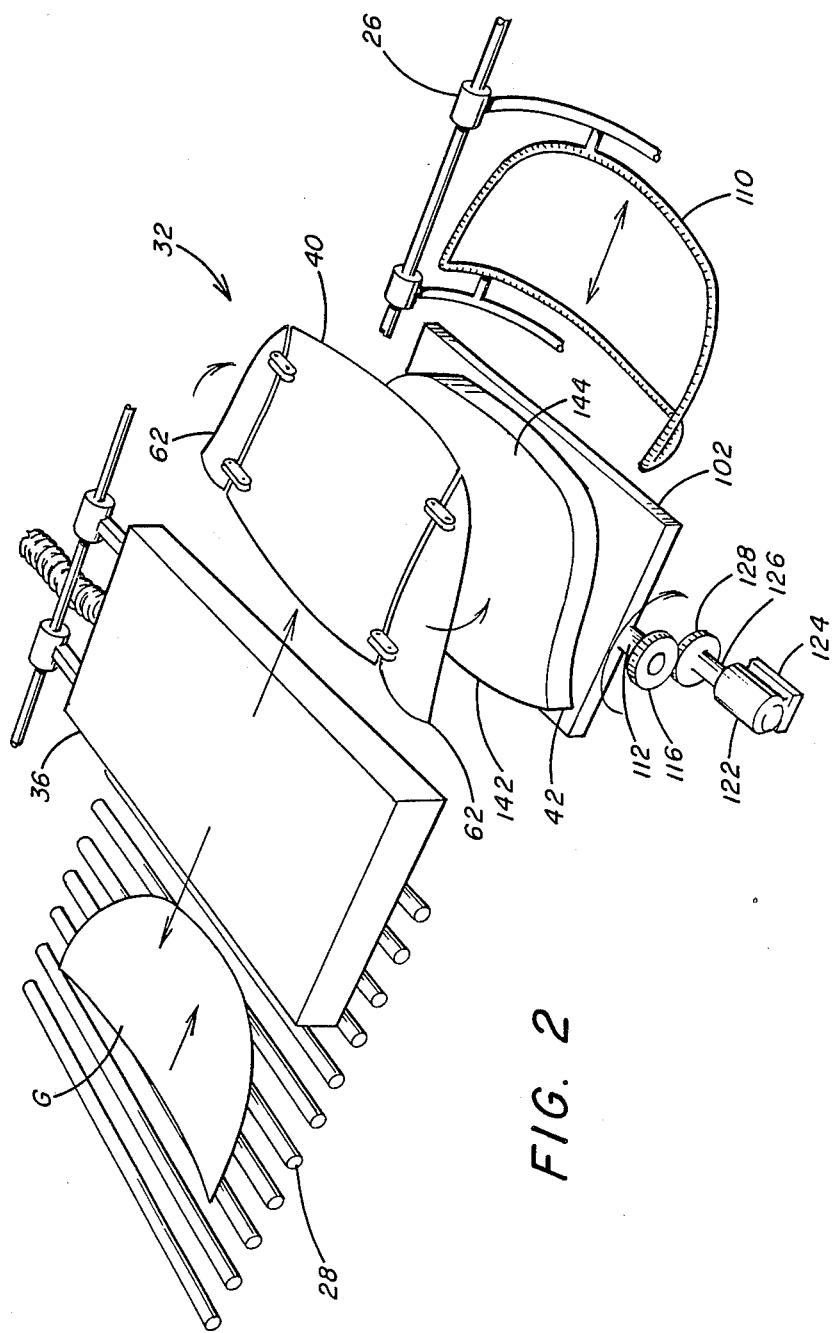
FIG. 2 is an isometric view of the invention shown in FIG. 1 illustrating the vacuum pick-up, pressing mold arrangement, and transfer ring system.

Referring to FIGS. 1 and 2, an apparatus for heating and shaping sheets of material, such as glass, includes a furnace 20 through which sheets of glass G are conveyed while being heated to their heat deformation temperature. A cooling station 22 for cooling the curved glass sheets and an unloading station (not shown) is located beyond the cooling station 22 to the right of the furnace 20. A shaping station 24 is disposed between the furnace 20 and the cooling station 22. A sheet transfer device 26 located in the cooling station 22 transfers the shaped glass sheets from the shaping station 24 to the cooling station 22.

Heat may be supplied to the furnace 20 in any convenient manner, for example, from gas burners or by electrical radiant heaters or by a combination of both which heat supply means are well known in the art. In the particular embodiment illustrated in FIGS. 1 and 2, the furnace 20 includes a horizontal conveyor comprising longitudinally spaced, transversely extending conveyor rolls 28 that define a path of travel which extends through the furnace 20. The conveyor rolls 28 may be arranged in sections so that the speed of the different conveyor sections may be controlled and synchronized in a manner well known in the art for proper movement and positioning of glass sheets G through the furnace 20. It should be appreciated that although FIGS. 1 and 2 illustrate a conveyer including conveyor rolls 28, the furnace 20 is not meant to be so limited and as an alternate, may include a gaseous support bed and conveying arrangement (not shown) as disclosed in U.S. Pat. No. 4,508,556 to Bennett et al. which teachings are hereby incorporated by reference. The use of a gaseous support bed allows glass sheets with decorative painted surfaces to be conveyed through the furnace 20 with the painted surface facing downward. A glass sensing member 30 is located within the furnace 20 to initiate a cycle of operation for bending as will be discussed later.

The shaping station 24 includes a pair of vertically aligned upper and lower pressing molds 32, which are the subject of this invention. It should be appreciated that if it is required that the shaping station 24 be heated, it may be included within the furnace 20 as shown in FIG. 1 or in a separately heated chamber (not shown).

A transfer device 34 engages the heat softened glass sheet G within the furnace 20 and moves it into the shaping station 24. Although not limited in the present invention, the particular embodiment illustrated in FIGS. 1 and 2 uses a shuttling vacuum pick-up 36. The pick-up 36 is positioned at the exit end of the furnace 20 where it draws a vacuum to lift a glass sheet G against its sheet engaging surface 38. If required, auxiliary lifters (not shown) may be used to lift the glass sheet G into engagement with the pick-up 36. The pick-up 36 then travels to a position between the molds 32 where it terminates the vacuum and deposits the heat softened glass sheet G at the shaping station 24. The pick-up 36 thereafter moves out of the shaping station 24, either back into the furnace 20 or to a position adjacent to the shaping station 24 (not shown).

It should be appreciated that the transfer device 34 may also be shuttling (not shown) platen that has a downwardly facing surface through which a vacuum can be drawn to support the heat softened glass sheet and pressurized gas is supplied so as to spaced the sheet from the surface such the sheet is held without the sheet physically contacting the surface of the platen, similar to that disclosed in U.S. Pat. No. 4,578,103 which teaching are hereby incorporated by reference.

Figure 3:
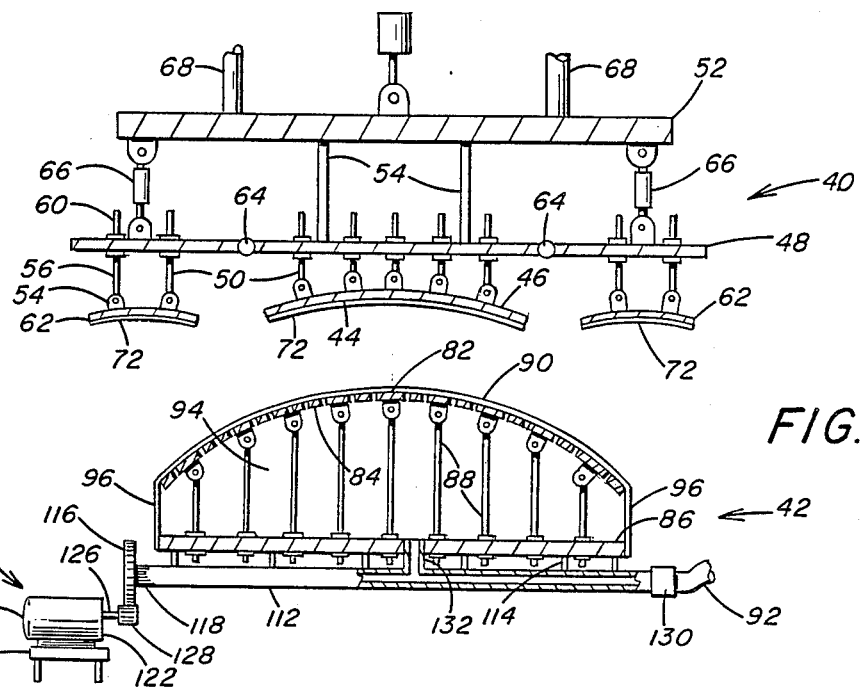
FIG. 3 is a view through line 3—3 in FIG. 1 showing the upper and lower pressing molds in a spaced, nonpressing relationship, with portions removed for clarity.
Figure 4:
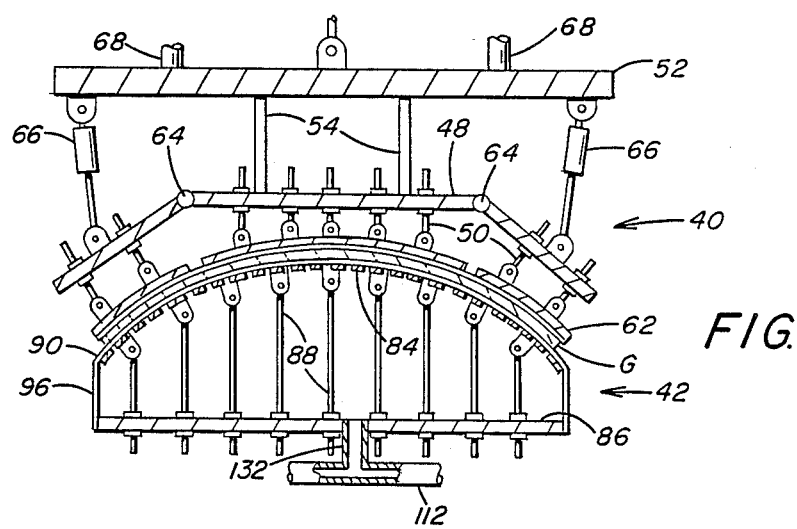
FIG. 4 is a view similar to that in FIG. 3 showing the upper and lower mold in pressing engagement, with portions removed for clarity.

The shaping station 24 includes an upper mold 40 and a lower vacuum mold 42. The upper mold 40 includes a downwardly facing female press face 44, i.e, the press face 44 is generally concave downward in elevation as shown in FIG. 3. The surface of the female press face 44 conforms to the final desired configuration of the glass sheet G to be shaped. Although not limiting to the present invention, the upper mold 40 may be similar in construction to that disclosed in U.S. Pat. No. 4,579,577 to Claassen, which teachings are hereby incorporated by reference. Referring to FIG. 3, the press face 44 of the upper mold 40 is preferably an imperforate flexible metal wall 46 connected to an upper mounting plate 48 through a plurality of adjustable connectors 50. Mounting plate 48 is secured to rigid backing plate 52 by struts 54. The connectors 50 include a rod 56 with a first end 58 pivotally connected to the inner surface of the wall 46 and an opposite end 60 extending through and adjustably secured to the mounting plate 48 so that the contours of the lower press face 44 can be modified. Referring to FIGS. 2 and 3, the press face 44 may also include pivoting wing sections 62, which pivot about hinges 64 in mounting plate 48 and are activated by pistons 66 which are connected between mounting plate 48 and face plate 52. The wing sections 62 are moved from an open non-engaging position as shown in FIG. 3 to a closed glass sheet shaping position as shown in FIG. 4 in a manner to be discussed later.

With continued reference to FIG. 3, rigid back plate 52 is suitably connected through upper vertical guides 68 to an upper support frame (not shown) and is movable relative thereto by an upper piston 70. If required, the press face 44 may be provided with a mold cover 72 of flexible material that does not mar hot glass sheets, such as fiberglass. The cover is secured across the press face 44 in any convenient fashion, e.g., clamps.

Figure 5:
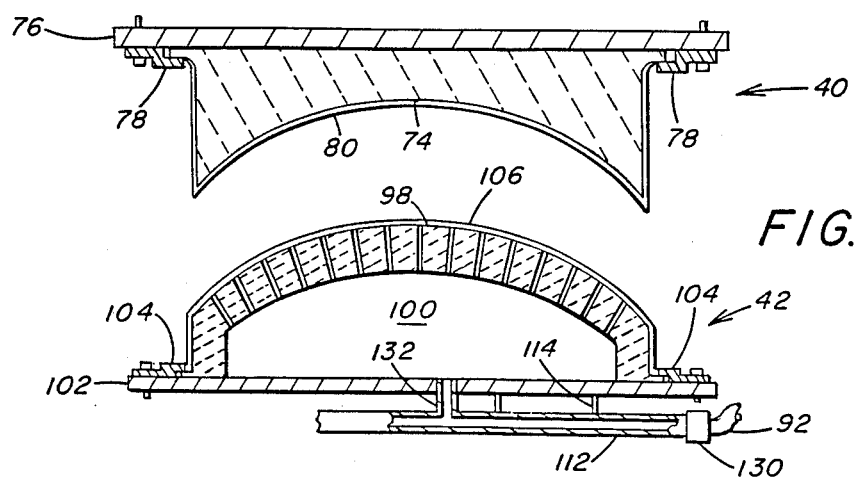
FIG. 5 is a view similar to FIG. 3 showing an alternate upper and lower pressing mold construction.

While the mold construction described in connection with upper mold 40 includes a flexible wall member 46, one skilled in the art will appreciate that the invention is not necessarily so limited and that an alternate mold construction may be used for the upper mold 40. Such a construction would include materials that provide and maintain a smoothly surfaced contour and good durability despite intermittent contact with hot glass which causes rapid cyclic temperature variations over an extended period. Although not limiting in the present invention, an alternate configuration of the upper mold 40 may be constructed in a manner similar to that disclosed in U.S. Pat. No. 4,265,650 to Reese et al., which teachings are hereby incorporated by reference. Referring to FIG. 5, upper mold 40 may include a ceramic press face 74 secured to a mounting plate 76 by bars 78. If required flexible cover 80 may be used to cover the press face 74.

The lower mold 42 is a full surface vacuum mold with an upwardly facing male press face 82, i.e., press face 82 is generally convex upward in elevation as shown in FIGS. 1 and 3. The surface of the press face 82 complements the surface of the female press face 44 of the upper mold 40. The lower mold 42 may be constructed in a manner similar to that of the upper mold 40 as described, supra. Referring to FIG. 3, an apertured flexible wall member 84 constructed from any flexible heat resistant material, for example steel, is adjustable connected to a mounting plate 86 by connectors 88, which may adjust the surface contours of the press face 82 in a manner similar to that in upper mold 40. The lower mold 42 is covered with a refractory cloth cover 90, such as fiberglass, to insulate the glass from the mold. The cover 90 is drawn across apertured press face 82 and secured to mounting plate 86 of the mold 42 in any convenient manner, for example, clamps.

Referring to FIGS. 1 and 3, the lower vacuum mold 42 communicates with a vacuum source (not shown) through an evacuation line 92 as will be discussed later. The source of pressurized air (not shown) and the valves for the vacuum and evacuation line 92 may be synchronized according to a predetermined time cycle as will be discussed later.

Although not limiting in the present invention, vacuum chamber 94 of the lower vacuum mold 42 may be formed in a manner similar to that discussed in U.S. Pat. No. 4,579,577 to Claassen, by spanning the open edge area between the mounting plate 86 and the wall 84 with a non-porous, heat resistant material to seal the chamber 94. In the particular embodiment illustrated in FIGS. 1-3, the peripheral portion 96 of the fiberglass cover 90 spanning between the mounting plate 86 and wall 84 may be coated with a heat resistant silicon rubber, for example, Dow Corning 736 Silastic ® RTV or any other heat resistant sealant to prevent air flow therethrough and provide a vacuum seal. When vacuum is drawn in the vacuum chamber 94 through the evacuation line 92, the coated fiberglass cloth seals the space between the wall 84 and mounting plate 86 so that air enters chamber 94 only through the apertured wall 84.

As an alternative, the lower mold 42 may be constructed in a manner similar to that discussed, supra, with respect to upper mold 40. Referring to FIG. 5, the mold 42 may include an apertured ceramic press face 98 having an enclosed interior vacuum chamber 100 secured to mounting plate 102 by bars 104. Flexible cover 106 may be used to cover the press face 98.

Figure 13:
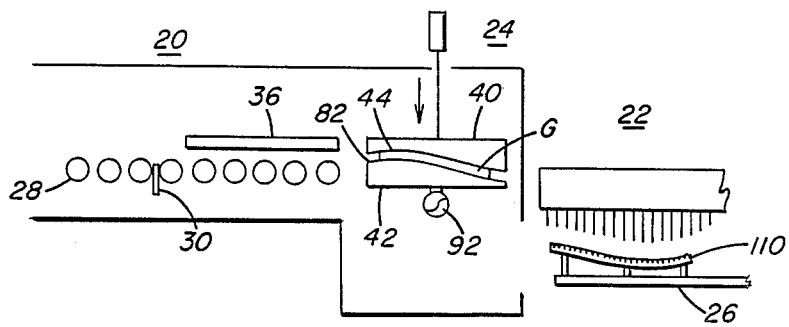
Figure 14:
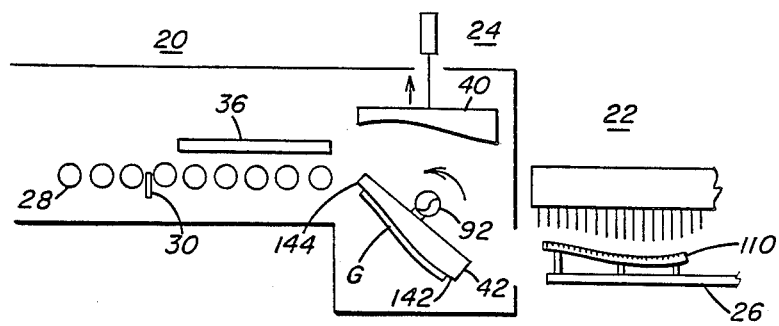
Figure 16:
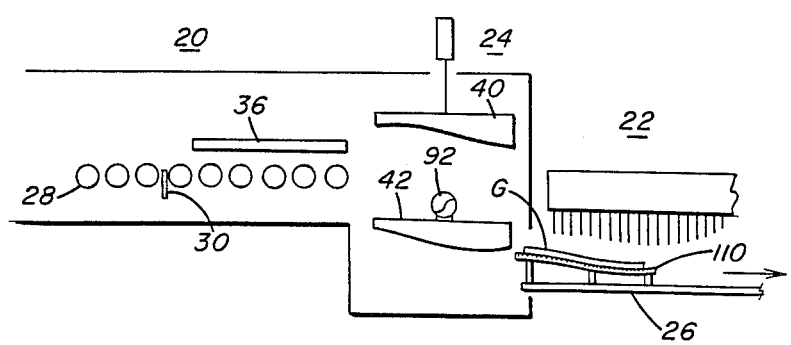
Figure 17:
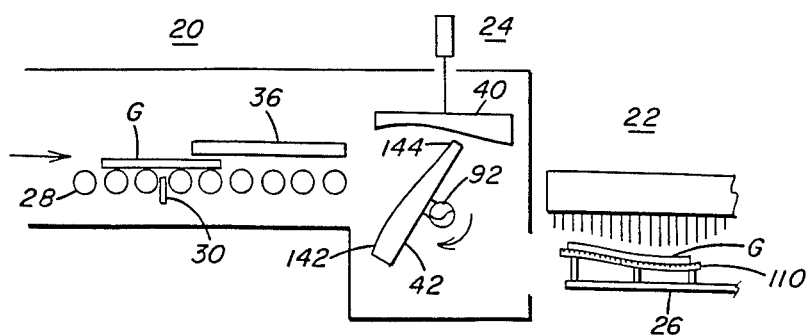

Mounting plate 86 of the lower vacuum mold 42 includes a rotating mechanism 108 to rotate the mold 42 about a generally horizontal axis. Although not limited in the present invention in the particular embodiment illustrated in FIGS. 1, 2 and 3, the mold 42 is rotated 180° about a horizontal axis transverse to the conveyed direction of the glass sheets G. The mold 42 is rotated to allow a shaped glass sheet G held against the press face 82 by vacuum to be deposited on the sheet transfer device 26 in the form of a tempering ring 110 as will be discussed later. The rotating mechanism 108 must be able to rotate the mold 42 and shaped glass sheet G from an upwardly facing position, to an inverted position and to reposition the empty mold 42 as shown in FIGS. 13-17. Although not limiting the present invention, in the particular embodiment illustrated in FIG. 3, the rotating mechanism 108 rotates the lower mold 42 about an axis extending transversely to the conveyed path of the glass sheet and includes a pivot rod 112 rigidly secured to the mounting plate 86 by posts 114. Sprocket 116 at end 118 of the rod 112 is rotated by drive assembly 120, which includes a reversible drive motor 122 mounted on platform 124, shaft 126 and gear 128. The motor 122 drives shaft 126 and gear 128, which in turn rotates mounting plate 86 through sprocket 116 and pivot rod 112 both in a counterclockwise and clockwise direction as shown in FIGS. 14 and 17, respectively.

In order to maintain vacuum in the lower mold 42 throughout the rotating operation, pivot rod 112 may be a hollow shaft with the evacuation line 92 connected thereto using a rotary coupling 130. A vacuum connection 132 extends from the rod 112 to mold 42 and into vacuum chamber 94 providing a passageway from the evacuation line 92 to the chamber 94. In this fashion, as the mold 42 is rotated, vacuum can be maintained within the chamber 94.

Figure 15:
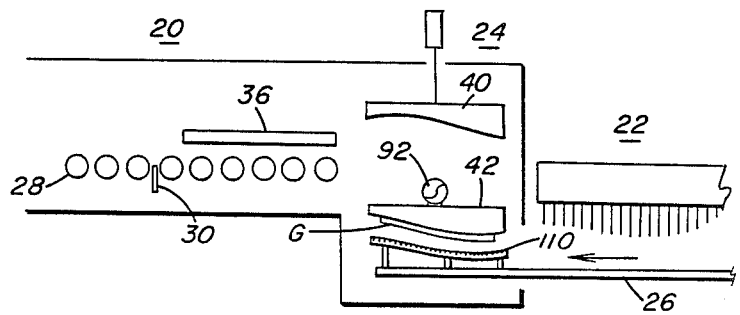

Referring to FIG. 15, tempering ring 110 is positioned beneath vacuum mold 42 when in an inverted position to receive the shaped glass sheet G after the vacuum in the mold 42 has been terminated and remove it to the cooling station 22 where it is rapidly cooled to provide a temper. The cooling station includes a plenum 134 and nozzles 136 to direct cooling fluid towards the major surfaces of the shaped glass sheet G as shown in FIG. 1.

Figure 7:
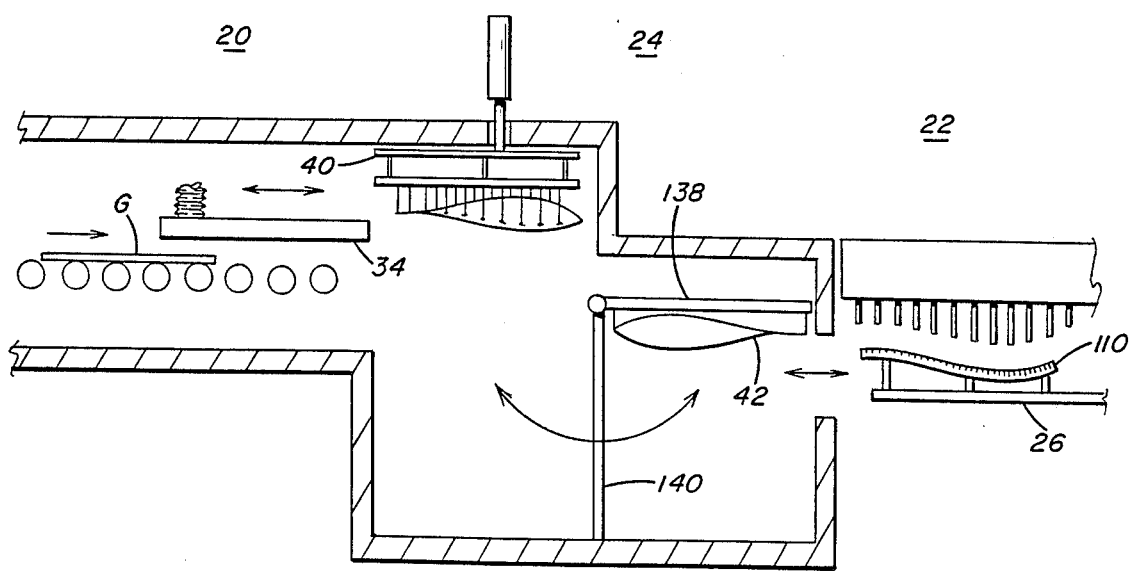
FIG. 7 is the embodiment of the invention shown in FIG. 7 with the lower mold in a second position.
Figure 8:
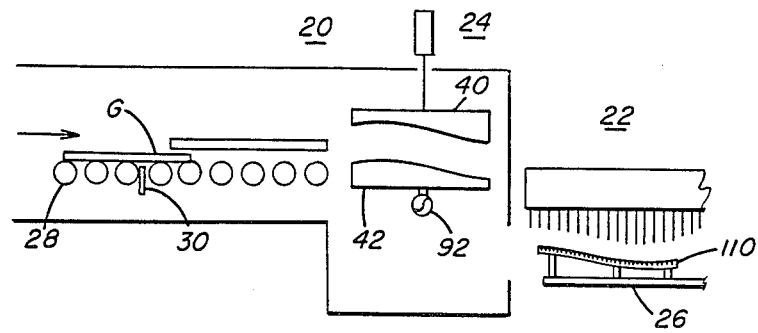
FIGS. 8 through 17 are a series of schematic elevational side views showing the operating sequence incorporating the present invention.

It should be obvious to one skilled in the art that rather than rotating mold 42 as shown in the embodiment of the invention illustrated in FIGS. 1 and 2, this embodiment may be modified as shown in FIGS. 7 and 8 by positioning the mold 42 on a pivoting arm member 138 on support 140 to rotate the mold 42 from its upwardly facing position as shown in FIG. 7 to its downwardly facing position as shown in FIG. 8 prior to depositing the shaped glass sheet G on the tempering ring 110.

Figure 9:
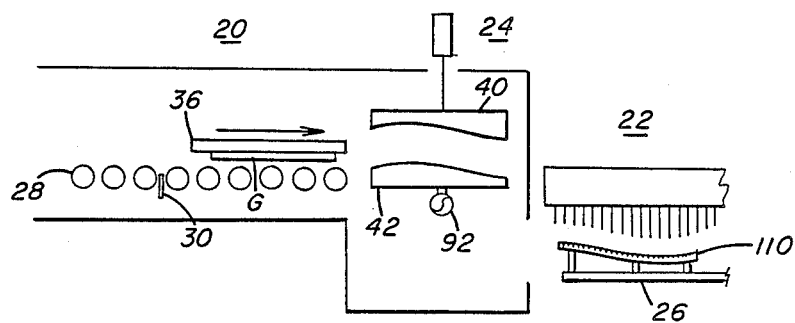
Figure 10:
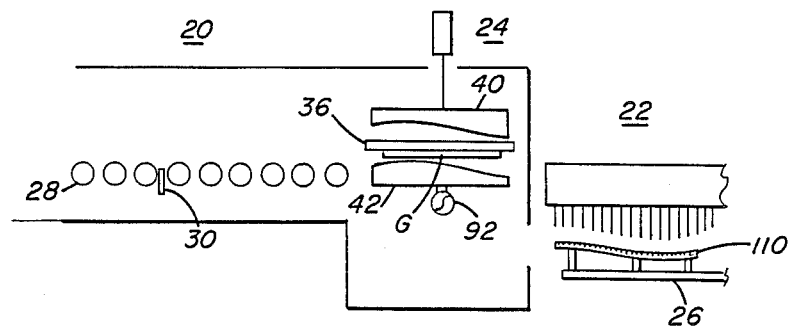

FIGS. 8 through 17 illustrate schematically the operating sequence of the present invention. Referring to FIG. 8, a series of glass sheets G pass serially through furnace 20 where they are heated to their heat softened temperature. Sensing device 30 senses the leading edge of a first glass sheet as it approaches the vacuum pick-up 36. When properly positioned beneath the pick-up 36, the glass sheet G is engaged by the pick-up 36 as shown in FIG. 9 and transferred to the shaping station 24 as shown in FIG. 10. If required, sensing mechanism 30 may start a timing sequence that, in effect, slows the conveying rate of the glass sheet G just prior to its engagement with the pick-up 36 so as to provide more accurate positioning of the glass sheet G relative to the pick-up 36.

Figure 11:
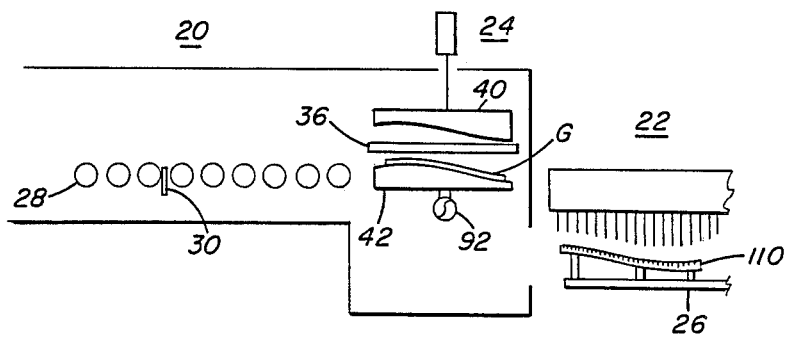
Figure 12:
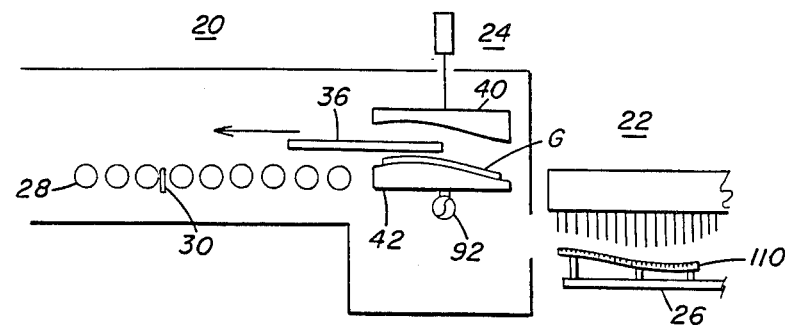

The vacuum pick-up 36 conveys the glass sheet G into the shaping station 24 where the vacuum is discontinued and the glass sheet G is deposited on the male press face 82 of the lower vacuum mold 42 as shown in FIG. 11. Vacuum pick-up 36 moves out of the shaping station 24, preferably back into the furnace 20 to prepare for the next glass sheet G as shown in FIG. 12. When the vacuum pick-up 36 has moved out of the shaping station 24, the top mold 40 moves downward via piston 70 to press the heat softened glass sheet G, as shown in FIG. 13, between the female press face 44 of the upper mold 40 and male press face 82 of lower mold 42. If the upper mold 40 includes pivoting wing portions 62 as illustrated in FIG. 2, pistons 64 rotate the wing sections 62 from an upward position as shown in FIG. 3 to a downward position as shown in FIGS. 4 as the mold 40 moves downward to press the glass sheet G.

Vacuum is drawn through the apertured wall member 84 of the lower mold 42 to hold the shaped glass sheet G thereagainst. After the upper mold 40 has retracted upwardly a sufficient distance, rotating mechanism 108 (shown in FIG. 3 only) is activated to rotate the mold 42 and the shaped glass sheet G as shown in FIG. 14. Since the glass sheet G is held by vacuum against the press face 82, it will not move relative to nor fall from the mold 42.

Figure 6:
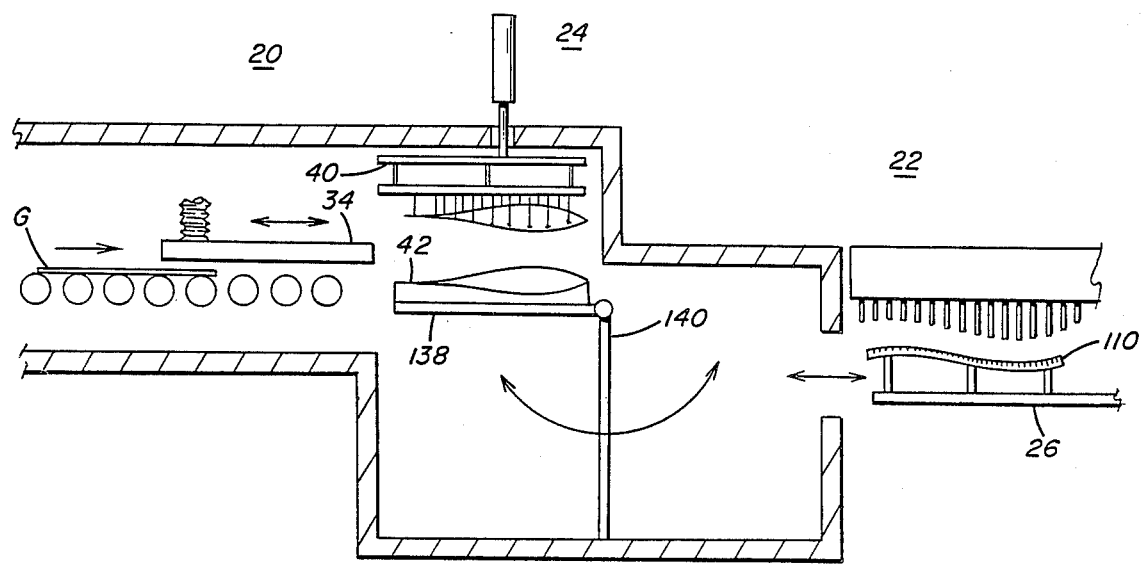
FIG. 6 is an elevational view similar to FIG. 1 illustrating an alternate embodiment of this invention with the lower mold in a first position, with portions removed for clarity.

After the mold 42 has been completely inverted, the tempering ring 110 is positioned beneath the mold 42 to receive the shaped glass sheet from the mold 42 as shown in FIG. 15. The vacuum in mold 42 is discontinued and the glass sheet G drops onto the tempering ring 110 which then conveys the shaped glass G into the cooling station 22 as shown in FIG. 16 where it is rapidly cooled to impart a temper. Rotating mechanism 108 thereafter rotates the mold 42 as shown in FIG. 17 back to its original position as shown in FIG. 6 to receive the next glass sheet G for shaping.

It should be noted that although not limited in the present invention, the mold 42 is preferably rotated clockwise to return it to its original position as viewed in FIG. 17. This direction of rotation allows the pick-up 36 to start its movement into the shaping station 24 prior to the mold 42 being completely rotated back to its original position because its upstream edge 142 will have passed the vacuum pick-up 36 prior to it being fully repositioned. If the mold 42 is rotated in a counter-clockwise direction, the downstream edge 144 of the mold 42 will not pass the vacuum pick-up 36 to allow it to move into the shaping station 24 until the mold 42 is almost completely rotated back into position.

The mold arrangement in the shaping station 24 as disclosed in this invention allows for the shaping of heat softened glass sheets into complex and compound curvature configurations such as reverse curvatures, deep wraps, small radius bends, etc. that were previously difficult to fabricate using conventional shaping techniques and equipment. It has been found that in order to impart such complicated configurations in a glass sheet G using mold arrangements with an upper mold having a male press face and a lower mold having a female press face, portions of the glass must be heated to temperatures higher than the remaining portion of the glass sheet in order to bend the sheets as required. In addition, the practice of bending the end sections of the glass upward to form the deep wrap sections of the glass is opposed by the natural tendency of the glass to sag downwardly under the force of gravity. As taught in the present invention, by depositing the glass sheets G on a lower mold with a full surface male press face, the glass sheet G will naturally begin to sag and conform to the shape of the press face due to gravity. In particular, the end portions of the glass which will form the deep wrap areas will sag downward due to gravity. As the upper mold moves downward to press the glass between the upper female press face and lower male press face, it further forces the glass sheet, and in particular the end portions, in the direction in which they would normally sag. The rotation of the mold after shaping allows the shaped glass sheet G to be deposited on a tempering ring of a conventional design, for subsequent processing.

It would be obvious to one skilled in the art that other mold configurations may be used. For example, upper mold 42 may be a ring type mold (not shown) so that only the perimeter of the glass sheet G is actually pressed between the upper mold 38 and lower mold 44 while the remaining forming of the glass sheet G is accomplished by sagging on the lower mold 42 and the mold 42 pulling a vacuum to draw the glass sheet G against its shaping surface.

The form of this invention shown and described in this disclosure represents an illustrative preferred embodiment and various modifications thereof. It is understood that various changes may be made without departing from the gist of the invention, as defined by the claimed subject matter which follows.

We claim:

1. An apparatus for shaping heat softened sheet material comprising:
   means to heat said sheet to its heat softening temperature;
   a shaping station including an upper mold with a downwardly facing shaping surface and a lower vacuum mold with an apertured upwardly facing shaping surface wherein said upwardly facing shaping surface complements said downwardly facing shaping surface;
   means to provide a vacuum to said lower mold;
   means to transfer said heat softened sheets from said heating means to said shaping station;
   means to shape said sheets between said upper and lower molds;
   means to rotate said lower mold and said shaped sheet held thereagainst by vacuum from a first position wherein said shaping surface of said lower mold faces upward and is in opposing relation to said shaping surface of said upper mold, to a second position wherein said shaping surface of said lower mold faces downward; and
   means to remove said sheet from said shaping station.

2. The apparatus as in claim 1 wherein said rotating means includes means to rotate said lower mold about a horizontal axis generally transverse to the direction of travel of said transfer means.

3. The apparatus as in claim 1 wherein said rotating means includes means to rotate said lower mold about a horizontal axis generally perpendicular to the direction of travel of said transfer means.

4. The apparatus as in claim 1 wherein the shaping surface of said upper mold has a generally concave downward elevational configuration.

5. The apparatus as in claim 4 wherein said lower mold includes an apertured, flexible wall adjustably secured to a rigid mounting plate.

6. The apparatus as in claim 4 wherein said lower mold includes an apertured ceramic press face secured to a rigid mounting plate.

7. The apparatus as in claim 5 further including means to maintain vacuum in said lower mold as said lower mold rotates.

8. The apparatus as in claim 7 wherein said shaping means includes means to vertically reciprocate said upper mold from a first position wherein said upper mold is spaced from said lower mold to a second position wherein said upper mold is in pressing engagement with said lower mold when said sheet is positioned therebetween.

9. The apparatus as in claim 8 wherein said upper mold is a ring-type mold.

10. The apparatus as in claim 8 wherein said upper mold is a full surface mold.

11. The apparatus as in claim 10 wherein said upper mold includes a flexible wall secured to a rigid mounting plate.

12. The apparatus as in claim 10 wherein said upper mold includes a full surface ceramic press face secured to a rigid mounting plate.

13. The apparatus as in claim 11 wherein said upper mold includes articulating wing sections which rotate from an upper position when said mold is in said first position to a down position when said upper mold is in said second position.

14. The apparatus as in claim 11 wherein said transfer means includes a shuttling vacuum pick up.

15. The apparatus as in claim 14 wherein said removing means includes a tempering ring with an elevational contour corresponding to said shaped glass sheet slightly inboard of the perimeter of said glass sheet.

16. The apparatus as in claim 15 further including means to rotate said lower mold back to its original position.

17. The apparatus as in claim 16 wherein said sheet material is a glass sheet.

18. A method of shaping heat softened sheet material comprising:
   heating said sheet to its heat softening temperature;
   depositing said heat softened sheet at a shaping station;
   shaping said heat softened sheet between an upper mold and lower mold at said shaping station;
   holding said shaped sheet against said lower mold;
   rotating said lower mold with said shaped sheet held thereagainst from a first position wherein said sheet is above said lower mold to a second position wherein said sheet is below said lower mold; and
   removing said shaped sheet from said shaping station.

19. The method as in claim 18 wherein said lower mold is a vacuum mold and said holding step includes drawing a vacuum through said vacuum mold to hold said sheet thereagainst.

20. The method as in claim 19 wherein said heating step includes heating a series of sheets advancing through a heating means and said rotating step includes rotating said lower mold about a horizontal axis transverse to the advancing direction of said sheets.

21. The method as in claim 19 wherein said heating step includes heating a series of sheets advancing through a heating means and said rotating step includes rotating said lower mold about a horizontal axis perpendicular to the advancing direction of said sheets.

22. The method as in claim 20 wherein said removing step includes terminating said vacuum in said upper mold to deposit said shaped sheet on a tempering ring.

23. The method as in claim 22 further including the step of repositioning said mold to a first position.

24. The method as in claim 23 wherein said sheet material is a glass sheet.

* * * * *